UNITED STATES PATENT OFFICE.

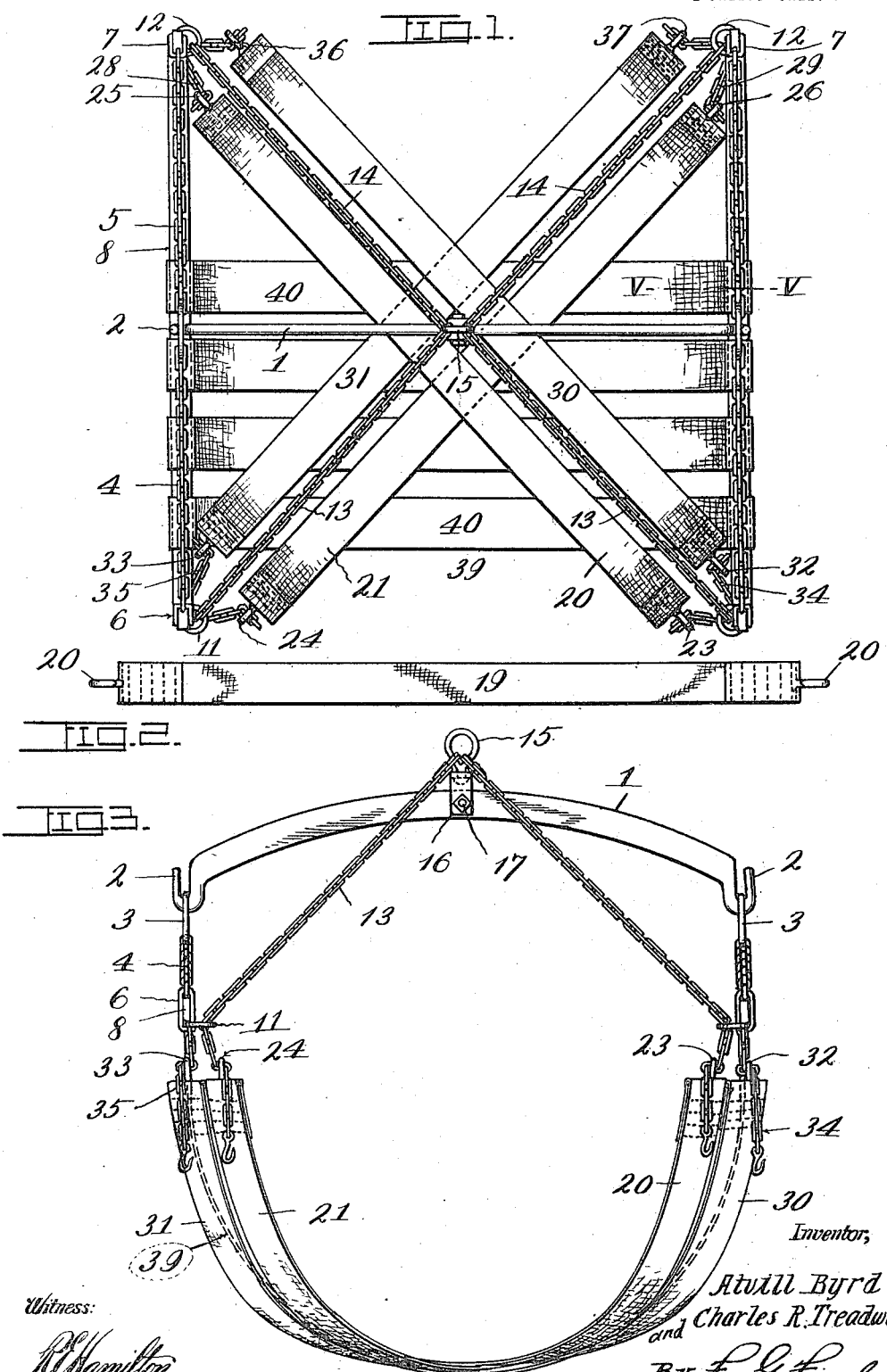

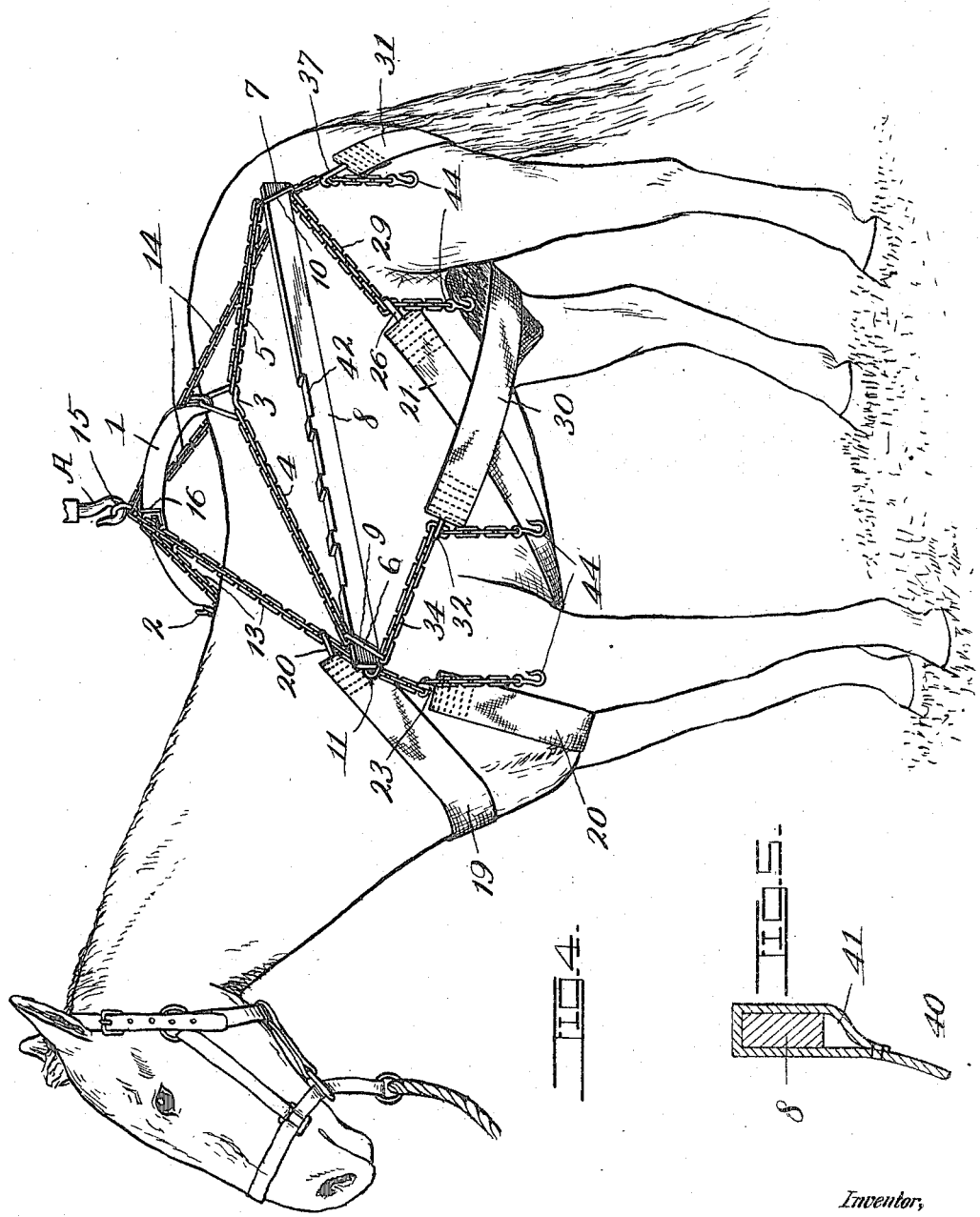

ATVILL BYRD AND CHARLES R. TREADWAY, OF KANSAS CITY, MISSOURI.

ANIMAL-SLING.

1,233,309.  Specification of Letters Patent.  Patented July 17, 1917.

Application filed October 2, 1916. Serial No. 123,262.

*To all whom it may concern:*

Be it known that we, ATVILL BYRD and CHARLES R. TREADWAY, citizens of the United States, residing at Kansas City, in the county of Jackson and State of Missouri, have invented certain new and useful Improvements in Animal-Slings, of which the following is a specification.

Our invention relates to animal slings, and one object is to provide a comparatively simple and inexpensive apparatus of this character whereby sick horses and cattle can be lifted to their feet and comfortably supported in a standing position.

A further object is to provide a sling which is anatomically correct and arranged to carry the weight of the animal at its fore and rear quarters as nature intended, instead of from the abdomen as heretofore with slings of ordinary construction.

Animals suffering from diseases wherein dyspnea is a marked symptom are not additionally embarrassed, as the abdomen is not subjected to pressure, nor is the circulation retarded.

Further advantages will hereinafter appear, and in order that the invention may be fully understood, reference will now be made to the accompanying drawings, in which:

Figure 1 is a diagrammatic view looking down upon the apparatus.

Fig. 2 is an elevation of a breast strap employed in carrying out the invention.

Fig. 3 is a front elevation of the parts disclosed by Fig. 1.

Fig. 4 shows the apparatus in position on a horse, with the belly girth removed.

Fig. 5 is broken cross section on line V—V of Fig. 1.

In carrying out the invention, we employ a transverse whiffletree 1, whereby the rest of the apparatus is suspended. The ends of said whiffletree terminate in hooks 2, provided with removable triangular links 3, each having a forwardly and downwardly extending cable 4, and a rearwardly and downwardly extending cable 5. Said cables 4 and 5 are provided at their outer ends with large links 6 and 7, respectively, for engagement over the ends of a pair of spreader bars 8 having inclined shoulders 9 and 10 to prevent the links 6 and 7, from slipping inwardly toward each other upon said bars.

The large links 6 and 7 have smaller links 11 and 12 for the passage of chains 13 and 14, respectively, secured at their upper converging ends to a swivel 15 mounted in a clevis 16, secured by a pivot 17 to the center of the whiffletree 1.

19 designates a breast strap provided with terminal hooks 20 for engagement with the cables 13, preferably, just above the forward ends of the spreader bars 8, as disclosed by Fig. 4.

20 and 21 designate a pair of fore girths provided at their forward ends with hooks 23 and 24, respectively, for engagement with the chains 13 at a point, preferably, below the forward ends of the spreader bars 8. The rear ends of the girths 20 and 21 are provided with hooks 25 and 26, for engagement with short cables 28 and 29, respectively, secured to the links 7.

30 and 31 designate a pair of rear girths provided at their forward ends with hooks 32 and 33 for engagement with short cables 34 and 35, respectively, secured at their forward ends to the large links 6. The rear ends of the girths 30 and 31 are provided with hooks 36 and 37, respectively, for engagement with the cables 14.

39 designates a belly girth comprising a plurality of straps 40 formed at their ends into loops 41, whereby they may be slipped over the ends of the spreader bars 8, which have notches 42 in their upper edges to prevent said loops 41 from slipping longitudinally of said bars.

When applying the apparatus to an animal standing in a stall or other place, the whiffletree 1 is suspended above the back of the animal from a hook A, which in turn may be supported by suitable means such as a cable running over a block, not shown, so that said whiffletree 1 may be readily adjusted to the proper height above the back of the animal. If the belly girth 39 is to be used the straps 40 are slipped into position upon the spreader bars 8, which are then supported at opposite sides of the animal by the links 6 and 7, and the cables 4 and 5, said cables 4 and 5 being in turn supported by the links 3 from the whiffletree 1. The fore girths 20 and 21 are then hooked to the chains 13 and passed between the animal's fore legs and after being crossed, the rear end of the girth 20 is hooked to the cable 28 and the rear end of the girth 21 is hooked to the cable 29. The rear girths 30 and 31 are then secured at their rear ends to the cables 14 and passed around between the rear legs of the animal where they are crossed, and then secured at their forward ends to the short cables 34 and 35, respectively. The breast strap 19 is then placed in position and hooked at its ends to the two cables 13. After the girths have been thus applied the animal is reliably supported in a standing position and can fall neither forward nor backward. As the hooks on the girths can be engaged with any part of the coacting cables, it is obvious that said girths can be adjusted to fit animals of different sizes.

If the animal is lying down and it is desired to lift it to a standing position, the fore and rear girths are arranged in four individual loops, the ends of each being secured together by its respective hooks. One loop is then slipped over each leg of the animal and engaged by the hooks 44 at the ends of the respective cables, after which the animal may be raised by pulling upward on the hook A as described.

When the belly girth is not in use and only the fore and rear girths are employed to support the animal in a standing position, it is apparent that practically the entire weight of the animal is supported at its fore and rear quarters and hence little or no pressure is applied to the abdomen, which is not intended by nature to support the animal.

Having thus described our invention, what we claim and desire to secure by Letters Patent, is:

1. In an apparatus of the character described, fore girths adapted to support the fore quarters of an animal, rear girths adapted to support the rear quarters of the animal, a member adapted to be suspended above the back of the animal, means connecting the girths and said member, and spreader bars adapted to be placed at opposite sides of the animal and spread said means apart.

2. In an apparatus of the character described, fore girths adapted to support the fore quarters of an animal, rear girths adapted to support the rear quarters of the animal, a member adapted to be suspended above the back of the animal, cables connecting the girths and said member, a pair of spreader bars adapted to be arranged at opposite sides of the animal to spread said cables apart, and a belly girth secured to said spreader bars.

3. An apparatus of the character described consisting of a member adapted to be supported above the back of an animal, cables diverging forwardly from said member, and adapted to pass on opposite sides of the animal, cables diverging rearwardly from said member and adapted to pass on opposite sides of the animal, rings through which the forwardly and rearwardly diverging cables extend, links carrying said rings, short cables extending rearwardly from two of said links, short cables extending forwardly from said links, spreader bars adapted to be arranged at opposite sides of the animal to engage and hold said links apart, fore girths attached at the forward ends to the forwardly diverging cables and at their rear ends to the forwardly-extending short cables, rear girths attached at their rear ends to the rearwardly diverging cables and at their forward ends to the rearwardly-extending short cables, longer cables diverging forwardly and rearwardly and connected to the links, large links connecting said longer cables to the member supported above the back of the animal, and a breast strap attached at its ends to the cables diverging forwardly from the last-mentioned member.

4. In an apparatus of the character described, a pair of fore girths adapted to extend downwardly from opposite sides of the animal's breast, cross between its fore legs and extend rearwardly and upwardly to a point adjacent its flanks, a pair of rear girths adapted to extend around the animal's rear quarters, cross between its rear legs and extend forwardly and upwardly at opposite sides of its body, and supporting means for said girths.

5. In an apparatus of the character described, a pair of fore girths adapted to extend downwardly from opposite sides of the animal's breast, cross between its fore legs and extend rearwardly and upwardly to a point adjacent its flanks, a pair of rear girths adapted to extend around the animal's rear quarters, cross between its rear legs and extend forwardly and upwardly at opposite sides of its body, a pair of spreader bars adapted to be supported at opposite sides of the animal, means for supporting said spreader bars and means connecting the girths to said spreader bars.

In testimony whereof we affix our signatures in the presence of two witnesses.

ATVILL BYRD.
CHARLES R. TREADWAY.

Witnesses:
F. G. FISCHER,
L. J. FISCHER.

Copies of this patent may be obtained for five cents each, by addressing the "Commissioner of Patents, Washington, D. C."